(12) United States Patent
Benedetto et al.

(10) Patent No.: US 10,484,113 B1
(45) Date of Patent: Nov. 19, 2019

(54) TRANSMISSION RATE SELECTION IN MOBILE APPLICATIONS

(71) Applicant: FLUIDMESH NETWORKS S.r.l., Milan (IT)

(72) Inventors: Carmine Benedetto, Pisa (IT); Lorenzo Trisolini, Pisa (IT); Alessandro Erta, Milan (IT); Luca Bisti, Grosseto (IT); Umberto Malesci, Milan (IT)

(73) Assignee: FLUIDMESH NETWORKS S.R.L., Milan (IT)

(*) Notice: Subject to any disclaimer, the term of this patent is extended or adjusted under 35 U.S.C. 154(b) by 0 days.

(21) Appl. No.: 16/418,294

(22) Filed: May 21, 2019

(30) Foreign Application Priority Data

Sep. 17, 2018 (EP) .................................... 18194932

(51) Int. Cl.
| | |
|---|---|
| *H04L 12/28* | (2006.01) |
| *H04B 17/318* | (2015.01) |
| *H04W 40/12* | (2009.01) |
| *H04L 12/26* | (2006.01) |
| *H04J 1/16* | (2006.01) |

(52) U.S. Cl.
CPC .......... *H04B 17/318* (2015.01); *H04L 43/12* (2013.01); *H04W 40/12* (2013.01)

(58) Field of Classification Search
CPC ............................ H04B 17/318; H04W 40/12
USPC ................................ 370/252, 230, 329, 386
See application file for complete search history.

(56) References Cited

U.S. PATENT DOCUMENTS

| | | |
|---|---|---|
| 2005/0025254 A1 | 2/2005 | Awad |
| 2005/0227697 A1 | 10/2005 | Borst et al. |
| 2005/0286618 A1 | 12/2005 | Abe |
| 2009/0010216 A1 | 1/2009 | Li et al. |

(Continued)

OTHER PUBLICATIONS

I Lori Ayoade et al: "Throughput-based rate adaptation algorithm for IEEE 802.11 vehicle networks", IET NETW, The Institution of Engineering and Technology, Michael Faraday House, Six Hills Way, Stevenage, Herts. SG1 2AY, UK, vol. 4, No. 2, Mar. 1, 2015 (Mar. 1, 2015), pp. 111-118, XP006051615; ISSN: 2047-4954, DOI: 10.1049/IET-NET.2014.0043.

(Continued)

*Primary Examiner* — John Pezzlo
(74) *Attorney, Agent, or Firm* — Patzik, Frank & Samotny Ltd.

(57) ABSTRACT

A method of selecting a data transmission rate for transmitting a packet from a transmitting node to a receiving node in a wireless communication system. An updated predictive received signal quality indicator value reflecting signal quality expected to be experienced by the receiving node on the packet received from the transmitting node is obtained, as is a best instance data transmission rate corresponding to a received signal quality indicator sub-range that includes the obtained updated predictive received signal quality indicator value. The packet from the transmitting node is transmitted to the receiving node using the obtained best instance. The transmitting node periodically performs a test procedure wherein a packet is instead transmitted using a test instance selected among the set of instances for the received signal quality indicator sub-range that includes the obtained updated predictive received signal quality indicator value.

15 Claims, 6 Drawing Sheets

(56) References Cited

U.S. PATENT DOCUMENTS

2014/0071977 A1* 3/2014 Morrill ................. H04L 65/80
370/351
2018/0367421 A1* 12/2018 Cloonan ............ H04L 41/5067

OTHER PUBLICATIONS

Wee Lum Tan et al: "SNR-Based Link quality Estimation", 2012 IEEE 75th Vehicular Technology Conference (VTC Spring 2012): Yokohama, Japan, May 6-9, 2012, IEEE, Piscataway, NJ, May 6, 2012 (May 6, 2012), pp. 1-5, XP032202285; DOI: 10.1109/VETECS. 2012.6239865; ISBN: 978-1-4673-0989-9.
Extended European Search Report dated Feb. 18, 2019 in connection with European patent application No. 18194932.2.
Pravin Shankar et al: "CARS: Context-Aware Rate Selection for Vehicular Networks", 2008 IEEE International Conference on Network Protocols, pp. 1,12, Oct. 19-22, 2008, Orlando, FL, USA DOI: 10.1109/ICNP.2008.4697019 ISSN: 1092-1648.
Glen Judd et al: "Efficient Channel-aware Rate Adaptation in Dynamic Environments", Proceedings of the 6th International conference on Mobile systems, applications, and services, pp. 118-131, Association for Computing Machinery, Breckenridge, CO, USA— Jun. 17-20, 2008.

* cited by examiner

Fig. 2

TRANSMISSION RATE SELECTION IN MOBILE APPLICATIONS

CROSS-REFERENCE TO RELATED APPLICATION

This application claims the benefit of European patent application No. 18194932.2, filed Sep. 17, 2018, the entirety of which is incorporated herein by reference.

BACKGROUND OF THE INVENTION

1. Field of the Invention

The present invention relates, in general, to wireless communication systems and, more particularly, to the selection of transmission parameters, including data transmission rates, for transmitting packets of data within wireless communications systems.

2. General Background of the Invention

The widespread cellular network coverage has made ubiquitous Internet connectivity taken for granted. Such services are evolving and are currently characterized by a rapid increase in their demand for bandwidth. Multimedia contents and communications, such as high quality video streaming or real time video calls, are gaining popularity and soon end users will expect to access those services from anywhere.

At the same time, the diffusion of high-speed trains is growing world-wide as a rapid and environmentally friendly means of transportation for long-distance mobility. Providing broadband connectivity on trains and metro systems to support multimedia services is becoming a critical service to fulfil customer expectations, appreciated in particular by business travellers.

In addition to improve customers' satisfaction, the evolution towards Intelligent Transportation Systems (ITS) will require a new generation of services for control, automation and monitoring. The implementation of real-time video surveillance for remote surveillance of trains and the installation of a large number of sensors and actuators for remote diagnostic and telemetry will demand for broadband connectivity that can ensure reliability, customizable Quality of Service (QoS) and high bandwidth.

Wireless communication in high-speed vehicular mobility scenarios poses complex technical challenges across several layers of the ISO-OSI stack, including the physical layer and the Medium Access Control (MAC) layer.

The physical layer specifies the actual modulation/demodulation technique used to transmit packets over the air.

Distortion effects like the Doppler effect may negatively impact the performance of the physical layer. Modern modulation techniques like OFDM (Orthogonal Frequency Division Multiplexing) and diversity transmission techniques like MIMO (Multiple Input, Multiple Output) can reduce the impact of distortive phenomena on the channel and, thus, allow obtaining good transmission performance even in high-speed vehicular communication scenarios. MIMO-OFDM physical layer operating at 5 GHz that provides good throughput performance at several miles distance using fairly directive antennas on the trackside. In Europe, a significant portion of the 5 GHz spectrum falls within the ISM band (ITU-R sections 5.138, 5.150 and 5.280) as prescribed by the European Commission based on the CEPT recommendations and the ETSI standards. The European standard EN301893 version 1.7.1 regulates the use of the 5.15-5.75 GHz band. Channel bandwidths supported are 20, 40 MHz, 80 MHz and 160 MHz wide and the maximum E.I.R.P allowed is 1 W (30 dBm). In North America, a significant portion of the 5 GHz spectrum falls within the ISM band as prescribed by the FCC and Industry Canada. The FCC and Industry Canada regulate the use of the 5.15-5.75 GHz band and of the 5.725-5.825 GHz band. Channel bandwidths supported are 20, 40 MHz, 80 MHz and 160 MHz wide and the maximum E.I.R.P allowed is 4 W in most circumstances. The FCC has been providing special waivers to certain rail companies in order to exceed the 4W limit as well. Based on the signal-to-noise ratio, several modulations and coding schemes (MCSs) can be used ranging from 6 Mbps to 866 Mbps throughput for an 80 MHz channel width.

Right above the physical layer, Medium Access Control (MAC) layer is in charge of coordinating the access to the channel by defining a suite of protocols and algorithms that are in common among the wireless devices. Moreover, the MAC layer selects the transmission parameters, like modulations and coding schemes (MCSs) and data transmission rate, to be used by the physical layer according to suitable selection algorithms. Such selection is critical to obtain good performance and maximize the throughput of the radio communication system. Transmission parameters selection depends on several factors including the signal level and its time variability. It is thus important designing transmission parameters adaptation algorithms specifically tailored to the application scenario.

Several algorithms and solutions have been proposed in the art.

It is noted that in a mobile scenario, especially in presence of high channel variability, the transmission parameters selection cannot be performed a posteriori, i.e. reacting to events already occurred such as packet retransmissions, because these approaches will not be fast enough to react to the rapid channel variation.

U.S. patent publication No. 2005/0227697 discloses a method for channel prediction in wireless networks wherein a base station operative to transmit data to a plurality of mobile units periodically receives channel condition indicator signals from said mobile units; periodically generates for each mobile unit a channel condition prediction based on a balanced estimate using the most recent channel condition indicator value and a mean of past channel condition indicator values, and uses the future channel condition predictions to select a mobile unit for service and to select a codeword size for transmission to each mobile unit.

Pravin Shankar, Tamer Nadeem, Justinian Rosca, Liviu Iftode ("CARS: Context-Aware Rate Selection for Vehicular Networks", 1-4244-2507-5/08/$20.00©2008 IEEE) discloses a context-aware rate selection algorithm for a vehicular network that makes use of context information (e.g. vehicle speed and distance from neighbour obtained with a GPS device on the vehicle) to predict packet error rate (PER).

Glen Judd, Xiaohui Wang, Peter Steenkiste ("Efficient Channel-aware Rate Adaptation in Dynamic Environments", Proceedings of the 6th international conference on Mobile systems, applications, and services, Pages 118-131, Breckenridge, Colo., USA—Jun. 17-20, 2008) discloses a transmission rate adaptation algorithm wherein a sender estimate a SINR (signal-to-interference and noise ratio) at the receiver and uses it to look up the best transmission rate in a rate selection table that lists the minimum required SINR threshold for each destination and for each transmission rate.

It is noted that the solution disclosed by Glen Judd et al. uses a reactive approach wherein the sender updates the thresholds in said rate selection table based on information on the success and failure of past transmissions.

Accordingly, it is an object of the present invention to provide an alternative, improved solution for transmission parameters selection in a wireless network, that guarantees high performance and throughput even in presence of high channel variability. These and other objects and features of the present invention will become apparent in view of the present specification, drawings and claims.

BRIEF SUMMARY OF THE INVENTION

In a first aspect of the present invention, the present disclosure thus relates to a method of selection of an instance among a set of instances of a plurality of transmission parameters, said plurality of transmission parameters including data transmission rate, for transmitting a packet from a transmitting node to a receiving node of wireless nodes in a wireless communication system, the method comprising the following steps performed by the transmitting node:

obtaining an updated predictive Received Signal Quality Indicator (RSQI) value reflecting signal quality expected to be experienced by the receiving node on the packet received from the transmitting node, obtaining a best instance, among the set of instances of said plurality of transmission parameters, in correspondence of a RSQI sub-range, among contiguous non-overlapping sub-ranges of a predefined range of RSQI values, that includes the obtained updated predictive RSQI value, transmitting the packet from the transmitting node to the receiving node by using said obtained best instance, wherein:

the transmitting node keeps a table associated with the receiving node wherein, for each RSQI sub-range and for each instance, the table comprises packet transmission feedbacks received by the transmitting node from the receiving node for a last packet transmitted from the transmitting node to the receiving node by using said instance, and for which the receiving node experienced an actual RSQI value, which is included in said RSQI sub-range, the best instance is determined by the transmitting node for each RSQI sub-range, based on the packet transmission feedbacks stored in the table in correspondence of the RSQI sub-range, the table is updated by means of a table update procedure anytime a feedback packet, comprising said transmission feedbacks, is received by the transmitting node from the receiving node after a packet is sent from the transmitting node to the receiving node, and the transmitting node periodically performs a test procedure wherein, instead of using the best instance, the packet is transmitted by the transmitting node to the receiving node by using a test instance, suitably selected among the set of instances for the RSQI sub-range that includes the obtained updated predictive RSQI value.

In a second aspect of the present invention, the present disclosure relates to a wireless node of a wireless communication system, configured to carry out the method according to the first aspect of the present disclosure.

In a third aspect of the present invention, the present disclosure relates to a wireless communication system comprising a wireless network and a plurality of wireless nodes each configured to carry out the method according to the first aspect of the present disclosure.

In a further aspect, the present disclosure relates to a computer program configured to implement the method according to the first aspect of the present disclosure.

In another aspect of the present invention, the present disclosure relates to a computer program product comprising program codes stored on a computer readable medium for carrying out the steps of the method according to the first aspect of the present disclosure.

In the present description and claims, the term "node" is used to indicate a node configured so as to carry out the method of according to the present disclosure.

The term "wireless node" is used herein to indicate a node having wireless functionalities. The node may be a wireless router or any other device such as a gateway, an access point, a server, a client device (such as a PC, tablet, laptop, mobile phone, and similar).

The present disclosure, in at least one of the aforementioned aspects, can be implemented according to one or more of the following embodiments, optionally combined together.

Preferably, the packet is a data packet.

In the present description and claims, the expression "data packet" is meant to indicate a basic unit of communication containing traffic data that travels over the wireless network.

"Data packets" differ from other types of packets, such as for example probe packets, alignment packets, beacon packets, that are instead "control packets" containing accessory information related to the node status.

Preferably, the RSQI is the Received Signal Strength Indicator (RSSI).

Preferably, the best instance is determined based on a transmission quality indicator.

In a preferred embodiment, the best instance is determined so as to optimize a transmission quality indicator, preferably the throughput.

Preferably, the transmission quality indicator is determined on the basis of the packet transmission feedbacks stored in the table. Once determined, the transmission quality indicator may be stored in the table together with the packet transmission feedbacks or instead of the packet transmission feedbacks.

Preferably, the packet transmission feedbacks comprise airtime (in milliseconds) and packet length (in bytes).

In such case, the throughput (in Mbps) is preferably determined on the basis of the airtime and packet length.

Preferably, the best instance is periodically determined for each RSQI sub-range. Preferably, the best instance is periodically determined for each RSQI sub-range within the table update procedure.

Preferably, for each RSQI sub-range, the determined best instance is marked in the table through a suitable flag.

Preferably, the step of obtaining the best instance is performed by retrieving from the table the best instance marked with the suitable flag in correspondence of said RSQI sub-range.

Preferably, for each RSQI sub-range, the best instance is determined among a suitably selected subset of candidate instances of the set of instances corresponding to said RSQI sub-range.

Preferably, the subset of candidate instances for each RSQI sub-range is predefined based on factory data of the transmitting node.

The factory data may comprise sensitivity thresholds of the transmitting node. The sensitivity thresholds are indicative of the instances of transmission parameters that are supported by the transmitting node for predetermined RSQI values.

In a preferred embodiment, for each RSQI sub-range, the subset of candidate instances is dynamically modified with respect to a predefined subset of candidate instances by adding an additional instance, corresponding to a higher or lower data transmission rate with respect to a maximum or minimum data transmission rate of the predefined subset, when the best instance periodically determined for the RSQI sub-range corresponds to said maximum or minimum data transmission rate and remains unchanged for a first predetermined time interval. This advantageously enables to make the procedure of determination of the best instance more flexible.

In said preferred embodiment, a modified subset of candidate instances is preferably restored to the corresponding predefined subset of candidate instances if, for a second predetermined time interval, no step of obtaining the best instance is performed for the RSQI sub-range corresponding to the modified subset of candidate instances.

In said preferred embodiment, said check if the best instance determined for the RSQI sub-range corresponds to said maximum or minimum data transmission rate and remains unchanged for a first predetermined time interval is preferably made after each period the best instance is periodically determined.

Preferably, the transmitting node periodically sends an aligning packet to the receiving node.

Preferably, the transmitting node periodically receives an aligning packet from the receiving node, the received aligning packet comprising an actual RSQI value experienced by the receiving node on a last aligning packet received by the receiving node from the transmitting node.

In a preferred embodiment, a prediction procedure is performed by the transmitting node, wherein each time an aligning packet is received by the transmitting node from the receiving node, the transmitting node determines an updated value of the predictive RSQI based on said actual RSQI value.

Preferably, the updated value of the predictive RSQI is determined on the basis of a balanced prediction using said actual RSQI value and a mean of past RSQI values.

Preferably, the updated value of the predictive RSQI is determined by using a DEWMA model.

Preferably, the updated value of the predictive RSQI is stored in a RSQI memory location of the transmitting node.

Preferably, the step of obtaining the updated predictive RSQI value is performed by retrieving it from said RSQI memory location.

Preferably, in the test procedure, the test instance is selected by means of a pseudo-random selection procedure.

In a preferred embodiment, in the test procedure, the test instance is selected by means of a selection procedure adapted to guarantee that, for the RSQI sub-range that includes the obtained predictive RSQI value, all instances of the set of instances are tested over the time and in a spread order.

Preferably, in the test procedure, the test instance is selected by means of a selection procedure adapted to guarantee that, for the RSQI sub-range that includes the obtained predictive RSQI value, all instances of the subset of candidate instances corresponding to said RSQI sub-range are tested over the time and in a spread order.

Preferably, the test procedure is carried out by performing a checking step before the step of selecting the best instance, the checking step comprising:
   checking whether a testing timer is expired;
   if the testing timer is expired, performing the step of selecting the best instance (whereby the packet is transmitted by using the best instance);
   if the testing timer is not expired, performing the test procedure (whereby the packet is transmitted by using the test instance).

Preferably, the test procedure is performed on data packets.

According to an embodiment of the present invention, the test procedure is preferentially performed when the packet to be transmitted is a low priority packet.

Low priority packets comprise, for example, browsing traffic and/or files sharing traffic packets; on the other side, high priority packets comprise, for example, voice and/or video data packets.

Preferably, besides data transmission rate, the set of transmission parameters include at least one of the following transmission parameters: MCS index, spatial stream, modulation type, coding rate, guard interval and channel bandwidth.

Preferably, the table comprises N rows, respectively corresponding to the set of N instances, and M columns, respectively corresponding to M sub-ranges of the predefined range of RSQI values.

Preferably, the rows of the table are sorted by increasing or decreasing data transmission rate.

Preferably, said best instance defines a number of best instances suitably prioritized.

More preferably, said number of best instances is prioritized, at least in part, based on optimization of the transmission quality indicator.

In such case, preferably at least the first prioritized best instance is selected based on optimization of the transmission quality indicator.

Preferably, at least the last prioritized best instance is selected based on its probability of achieving a successful transmission.

Preferably, for a packet transmitted from the transmitting node to the receiving node on the basis of an updated predictive RSQI value, when—in the feedback packet received by the transmitting node from the receiving node—the transmitting node detects a sudden drop of the actual RSQI value with respect to the updated predictive RSQI value, the actual best instance corresponding to the RSQI sub-range that comprises said actual RSQI value is replaced with an instance of the set of instances (preferably of the set of candidate instances for said RSQI sub-range) that corresponds to a lower data transmission rate with respect to the actual best instance. This embodiment advantageously enables to handle sudden signal drops.

The term "sudden drop in the actual RSQI value" indicates, for example, a decrease of the actual RSQI value with respect to the updated predictive RSQI value at least equal to 10 dB.

In a preferred embodiment, an active probing procedure of a further receiving node is performed by the transmitting node, prior to actual data packet transmission to said further receiving node, wherein:
   the transmitting node obtains a predictive RSQI value reflecting signal quality expected to be experienced by the further receiving node on the packet received from the transmitting node;

for the RSQI sub-range that includes the obtained predictive RSQI value, the transmitting node suitably selects a test instance among the set of instances;

the transmitting node sends an active probing packet to the further receiving node, using said suitably selected test instance;

the transmitting node keeps a table associated with said further receiving node wherein, for each RSQI sub-range of said predefined range of RSQI values and each instance of said set of instances (or, preferably, for each instance of a corresponding subset of candidate instances), the table comprises packet transmission feedbacks received by the transmitting node from the further receiving node, for a last active probing packet transmitted from the transmitting node to the further receiving node by using said instance, and for which the further receiving node experienced an actual the table associated with said further receiving node is updated by means of a table update procedure anytime a feedback packet, comprising said transmission feedbacks, is received by the transmitting node from the further receiving node after an active probing packet is sent from the transmitting node to the receiving node.

The active probing procedure advantageously enables the transmitting node to start to fill the cells of tables relating to other wireless nodes with which a wireless communication is active (e.g. aligning packets are successfully transmitted with them), prior to start actual data packet communication.

Preferably, for the table associated with the further receiving node, the transmitting node periodically determines a best instance, among said set of instances (or, preferably, among the corresponding subset of candidate instances), for each RSQI sub-range, based on the packet transmission feedbacks stored in the table in correspondence of the RSQI sub-range.

Preferably, the best instance is periodically determined for each RSQI sub-range within the table update procedure performed for the table associated with the further receiving node.

In addition, the transmitting node preferably periodically sends an aligning packet to the further receiving node.

Preferably the transmitting node periodically receives an aligning packet from the further receiving node, the received aligning packet comprising an actual RSQI value experienced by the further receiving node on the last aligning packet received by the further receiving node from the transmitting node.

Preferably, within the prediction procedure performed by the transmitting node, each time an aligning packet is received by the transmitting node from the further receiving node, the transmitting node determines an updated value of the predictive RSQI based on said actual RSQI value.

Preferably, the above mentioned table(s) is(are) stored in a memory of the transmitting node.

In a preferred embodiment of the present invention, the wireless nodes comprise mobile nodes and stationary nodes, the mobile nodes being movable with respect to the stationary nodes.

In an alternative embodiment of the present invention, the wireless nodes only comprise stationary nodes.

In another alternative embodiment of the present invention, the wireless nodes of the wireless communication network are in part in a primary domain and in part in one or more mobile domains, movable with respect to the stationary domain.

The primary domain indicates a pivot domain used as a reference domain for the mobility of one or more mobile domains. The expression "primary domain" includes the case of a primary domain which is movable itself.

According to an embodiment, the mobile domain is a vehicle. The vehicle can be, for example, a train, a boat, a bus or a car.

Preferably, the primary domain includes a plurality of the wireless nodes.

Preferably, each mobile domain includes one or more of the wireless nodes.

Further characteristics and advantages of the present invention will become clearer from the following detailed description of some preferred embodiments thereof, made as an example and not for limiting purposes with reference to the attached drawings.

BRIEF DESCRIPTION OF THE SEVERAL VIEWS OF THE DRAWINGS

FIG. 2 is an diagram of an example of a table T(x,y) kept by a transmitting node Sx for a receiving node Sy of the wireless communication system;

DETAILED DESCRIPTION OF THE INVENTION

Figure 1:
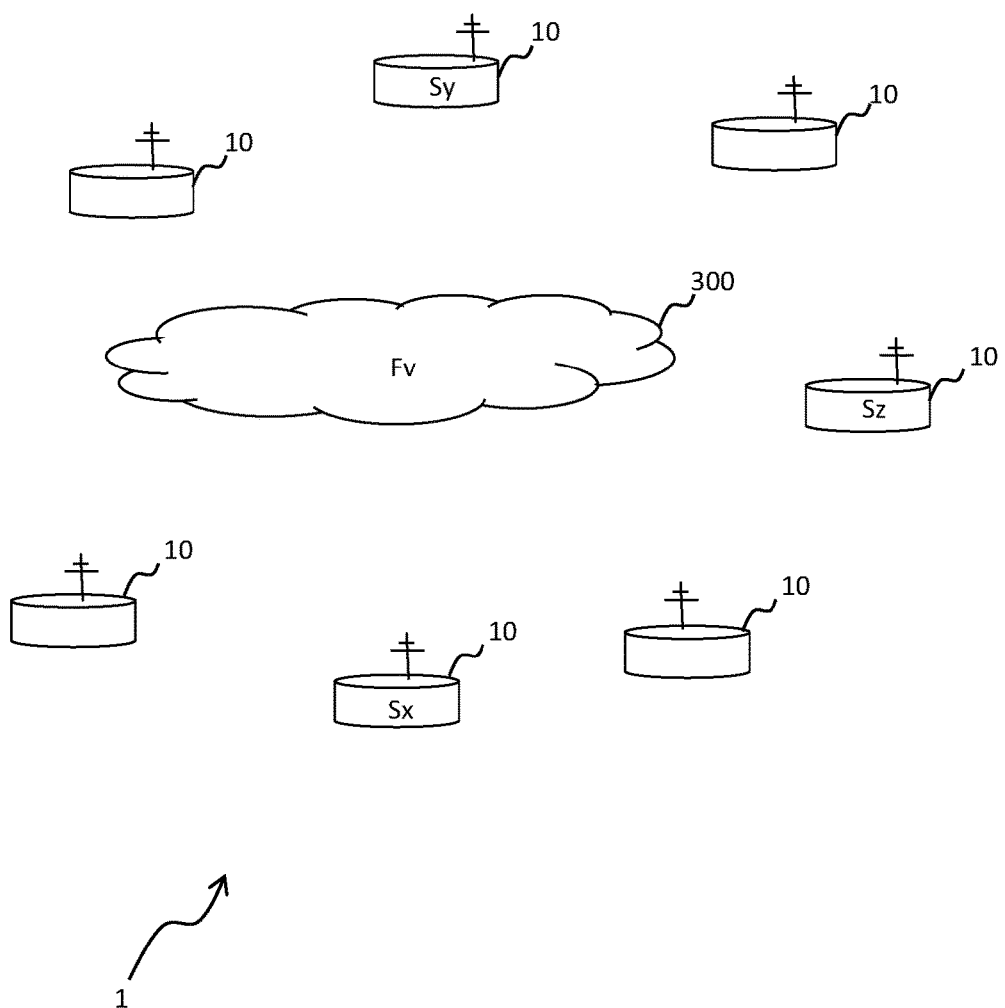
FIG. 1 is a schematic diagram showing a wireless communication system according to an embodiment of the present invention.

While the present invention is susceptible of embodiment in many different forms, there is shown in the drawings and will herein be described in detail, several specific embodiments, with the understanding that the present disclosure is intended as an exemplification of the principles of the present invention and is not intended to limit the invention to the embodiments illustrated.

FIG. 1 shows a wireless communication system 1 according to an embodiment of the present disclosure, comprising wireless nodes 10 and a wireless communication network 300.

Wireless nodes 10 have each at least one wireless interface with a radio configured to a wireless channel Fv. The wireless channel Fv enables the wireless nodes 10 to radio communicate with each other through the wireless communication network 300.

The wireless communication network 300 provides the wireless channel Fv. The wireless communication network 300 can be implemented, for example, according to IEEE 802.11 standard.

Each wireless node 10 comprises hardware, software and/or firmware configured to implement the method according to the present disclosure so as to dynamically select, for each packet P to be sent by the wireless node 10, the best instance of transmission parameters to be used to transmit the packet P, depending on current signal quality conditions.

The best instance is selected among a set of instances of a predefined plurality of transmission parameters.

The plurality of transmission parameters comprises the data transmission rate.

In an embodiment, wherein, for example, the wireless communication network 300 is implemented according to IEEE 802.11 standard, the plurality of transmission parameters preferably comprises: MCS index, Spatial Streams, Channel Width and Guard Interval that, as a whole, univocally correspond to a specific Modulation Type, Coding Rate and Data transmission rate (in Mbit/s).

The packets can be transmitted according to a predefined set of N instances of the transmission parameters.

For example, the predefined set of N instances is of the following type:

| Instance index | MCS streams | Spatial type | Modulation rate | Coding bandwidth | Channel Interval | Guide (Mbit/s) | Data rate |
|---|---|---|---|---|---|---|---|
| 1 | 0 | 1 | BPSK | 1/2 | 20 MHz | Long | 6.5 |
| 2 | 0 | 1 | BPSK | 1/2 | 20 MHz | Short | 7.2 |
| 3 | 0 | 1 | BPSK | 1/2 | 40 MHz | Long | 13.5 |
| 4 | 0 | 1 | BPSK | 1/2 | 40 MHz | Short | 15 |
| 5 | 1 | 1 | QPSK | 1/2 | 20 MHz | Long | 13 |
| 6 | 1 | 1 | QPSK | 1/2 | 20 MHz | Short | 14.4 |
| 7 | 1 | 1 | QPSK | 1/2 | 40 MHz | Long | 27 |
| 8 | 1 | 1 | QPSK | 1/2 | 40 MHz | Short | 30 |
| ... | ... | ... | ... | ... | ... | ... | ... |
| N | ... | ... | ... | ... | ... | ... | ... |

According to the present disclosure, each wireless node 10 (e.g. Sx) keeps a table for each other wireless node 10 (e.g. Sy or Sz) with which a wireless communication can be established.

Figure 2:
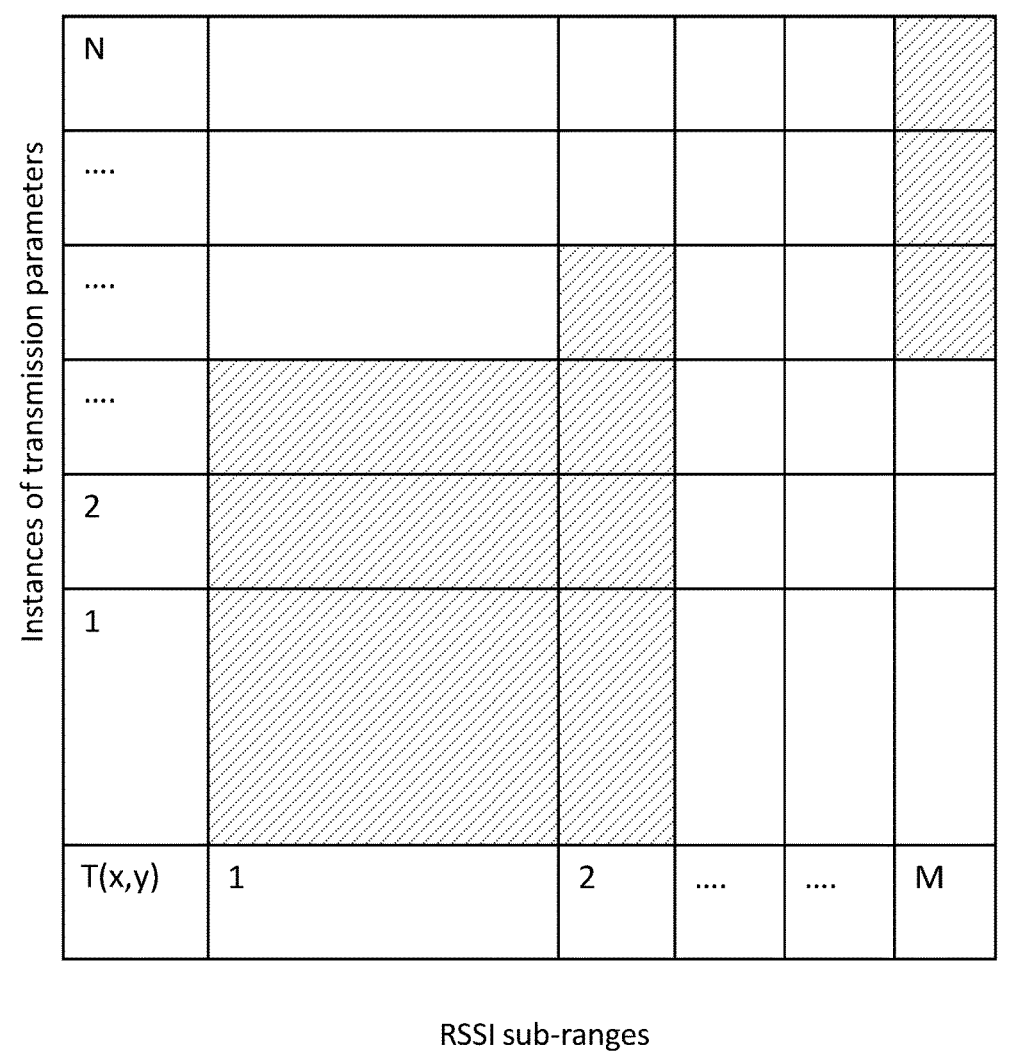

As schematically shown in FIG. 2 with reference to the couple Sx and Sy, the table T(x,y) comprises N rows and M columns. The N rows correspond to the set of N instances of the plurality of transmission parameters. Preferably, the N instances are sorted as table rows by increasing or decreasing data transmission rate. The M columns correspond to M sub-ranges of a predefined range of RSSI values. The definition of the range and M sub-ranges can be determined according to several criteria which may include, for example, sensitivity of the wireless chip of the node 10 itself (e.g. Sx). Preferably, M is of the order of units, and N is of the order of tens; for example, M may range from 3 to 9, and N may range from 20 to 50. The predefined range of RSSI values may range from −96 to 0 dB.

The RSSI sub-ranges can have all a same width or they can have different widths depending on the specific application.

By way of a non-limiting example, width of each RSSI sub-range may be chosen based on a probability of occurrence of the RSSI values within said sub-range. In other words, according to this example, larger widths are associated to RSSI sub-ranges including RSSI values that are more likely to be obtained during transmission (typically, "central" RSSI sub-ranges), while smaller widths are associated to RSSI sub-ranges including RSSI values that are less likely to be obtained (typically, "edge" sub-ranges), according to an approximately Gaussian distribution of said probability of occurrence within the range of RSSI values. However, the RSSI sub-ranges can be defined in other ways that will be clear to person skilled in the art in view of the present disclosure.

The advantages of using said sub-ranges of RSSI values instead of individual values of RSSI will be clear later on from the description made in connection with FIG. 4.

It is noted that even if reference is made to the RSSI as specific example of Received Signal Quality Indicator (RSQI), the present disclosure may also apply to other RSQIs.

Referring back to FIG. 2, each cell, at the $i^{th}$ row and $j^{th}$ column of each table T(x,y) kept by a wireless node 10 (e.g. Sx) for another wireless node 10 (e.g. Sy), comprises packet transmission feedbacks received by node Sx from node Sy for any last packet transmitted from node Sx to node Sy by using the instance of transmission parameters corresponding to the $i^{th}$ row and for which the receiving node Sy experienced an actual RSSI value, which is included in the RSSI sub-range corresponding to the $j^{th}$ column.

In a preferred embodiment, for each column of the table (corresponding to a specific RSSI sub-range) only a subset of rows are taken into account, corresponding to a subset of candidate instances among the set of N instances of the plurality of transmission parameters.

For each table T(x,y) kept by node Sx for node Sy, the subset of candidate instances can be determined according to several criteria which may include, for example, factory data of node Sx. These factory data typically depend on the specific wireless chip employed in the wireless node and may comprise, for example, sensitivity thresholds of the wireless chip. Indeed, for certain levels of RSSI, packet transmission of a wireless chip is typically optimized using a specific set of Modulation Coding Schemes (MCSs). Accordingly, for each RSSI sub-range, the subsets of candidate instances are preferably selected to correspond to the instances supported by the wireless chips for such RSSI sub-range.

This advantageously enables, for each specific RSSI sub-range (i.e. for each table column), to take into account only instances of transmission parameters that are reasonable for said specific RSSI sub-range (e.g. instances corresponding to low data transmission rates for RSSI sub-ranges corresponding to low RSSI values, instances of medium data transmission rates for RSSI sub-ranges corresponding to medium RSSI values, and instances of high data transmission rates for RSSI sub-ranges corresponding to high RSSI values). As it will be clearer from the following disclosure, this provision advantageously allows to further optimize the test procedure described in detail below (see FIG. 4), especially when the table comprises many rows, because it enables to perform the test procedure more efficiently, only on a "reasonable" subset of candidate instances of transmission parameters.

It is noted that even if the preferred embodiment is taken into account in the following description, wherein a subset of candidate instances is used (instead of the whole set of instances) for each RSSI sub-range, the present disclosure also applies to an embodiment wherein all instances are considered for each sub-range.

According to the present disclosure, each wireless node 10 (e.g. Sy) periodically broadcasts every Tp milliseconds (e.g. Tp=100 ms) an aligning packet. The aligning packet is preferably transmitted using a fixed reference modulation rate. The aligning packet comprises a list of RSSI records, one for each other wireless node 10 (e.g. Sx) whose aligning packet has been received by wireless node 10 (e.g. Sy) in last few milliseconds. In particular, each RSSI record comprises the MAC address of the wireless node (e.g. Sy), the actual RSSI value determined by the wireless node (e.g. Sy) on the last aligning packet received by the wireless node (e.g. Sy) from the other wireless node 10 (e.g. Sx) and a timestamp of the last reception.

Figure 3:
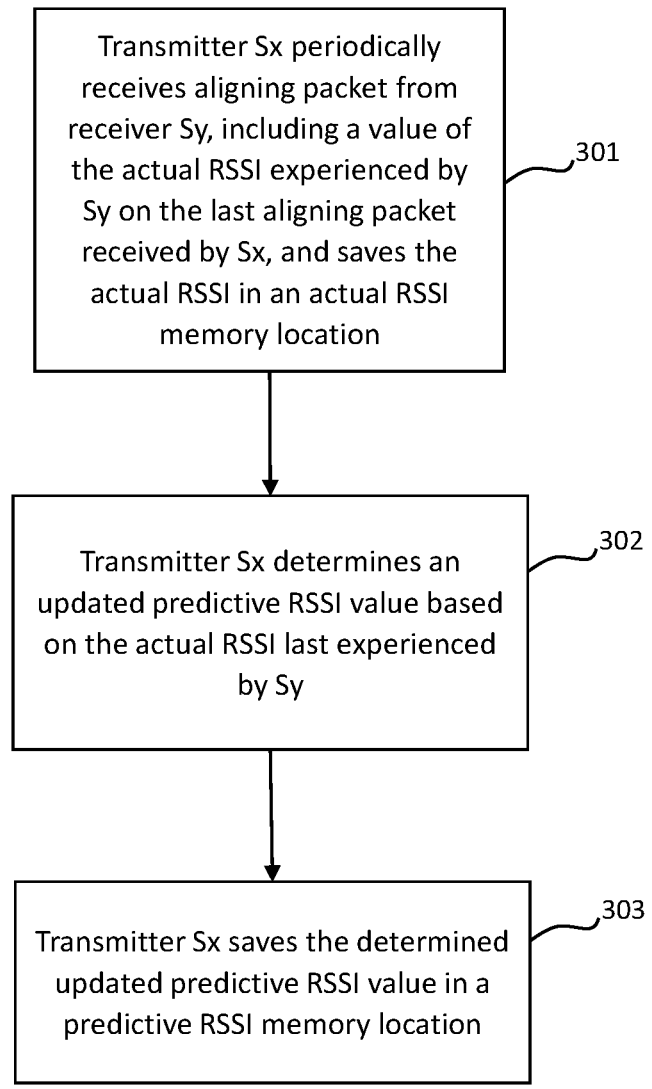
FIG. 3 is a block diagram of a RSSI prediction procedure according to an embodiment of the present invention.

As schematically shown in FIG. 3, each wireless node (e.g. Sx) periodically receives (block 301) aligning packets by each other wireless node 10 (e.g. Sy) and saves the actual RSSI value contained in the received aligning packet in a corresponding actual RSSI memory location.

At block 302, the wireless node (e.g. Sx) determines for each of the other wireless nodes 10 (e.g. for node Sy) an updated predictive RSSI value based on the actual RSSI value included in the last received aligning packet by such a node (e.g. Sy), as saved in the actual RSSI memory location.

Preferably, said updated predictive RSSI value is determined on the basis of a balanced prediction using the actual RSSI value and a mean of past RSSI values. The determination is made by node Sx at a time $t_i$ predicting RSSI value at time $t = t_i + \tau$ based on actual RSSI value $s(t_i)$.

According to a preferred embodiment, the updated predictive RSSI value is determined by using a Double Exponential Weighted Moving Average (DEWMA) model, which is defined as follows:

$$PredictedRSSI(t_i+\tau) = A(t_i) + \tau/Tp * b(t_i)$$

where A(t) and b(t) are factors further specified by the following equations:

$$A(t_i) = \alpha s(t_i) + (1-\alpha)(A(t_{i-1}) + b(t_{i-1}))$$

$$b(t_i) = \gamma(A(t_i) - A(t_{i-1})) + (1-\gamma)b(t_{i-1}).$$

wherein $\alpha$ and $\gamma$ are relative weights with $0 < \alpha < 1$, $0 < \gamma < 1$.

The weights $\alpha$ and $\gamma$ can be fixed values (e.g. experimentally determined a priori depending on the specific applications) and, optionally, may be dynamically adjustable during use.

For example, $\alpha$ and $\gamma$ may range each from 0.4 to 0.6.

In particular, A(t) enables to make a weighted average of the most recent RSSI value $s(t_i)$ and a mean of past RSSI values. This advantageously enables to smooth RSSI variations, in particular high-frequency variations. On the other side, b(t) enables to consider the trend of the weighted average A(t). This advantageously enables to determine the updated predictive RSSI value taking into account the trend of the RSSI. In particular, the estimate of the RSSI value will be increased or decreased depending on the trend (positive or negative) of the RSSI and for an amount proportional to $\tau/Tp*b(t_i)$.

A DEWMA filter is particularly advantageous since it enables to obtain a good compromise between conflicting requirements of low computational complexity and high convergence time of the prediction procedure.

The prediction procedure is particularly advantageous in a mobility scenario wherein the RSSI value actually obtained at time $t = t_i + \tau$ by $S_Y$ from $S_X$ may differ significantly from the actual value $s(t_i)$ obtained by $S_Y$ at time $t_i$, due to the effect of the relative movement of the two nodes occurred during the time $\tau$ elapsed since the last update. The difference is particularly relevant in high-speed mobility scenarios such as fast trains, where the channel coherence time is in the same order of magnitude as $T_p$ or smaller.

Each time it is determined, the updated predictive RSSI value is stored (block 303) in a suitable predictive RSSI memory location of a memory of the wireless node 10 (e.g. Sx), replacing the last predicted value present in the RSSI memory location.

It has to be noted that the result of the prediction procedure improves at each subsequent reiteration of the procedure, namely the estimate of the updated value of the predictive RSSI improves at each reiteration.

Figure 4:
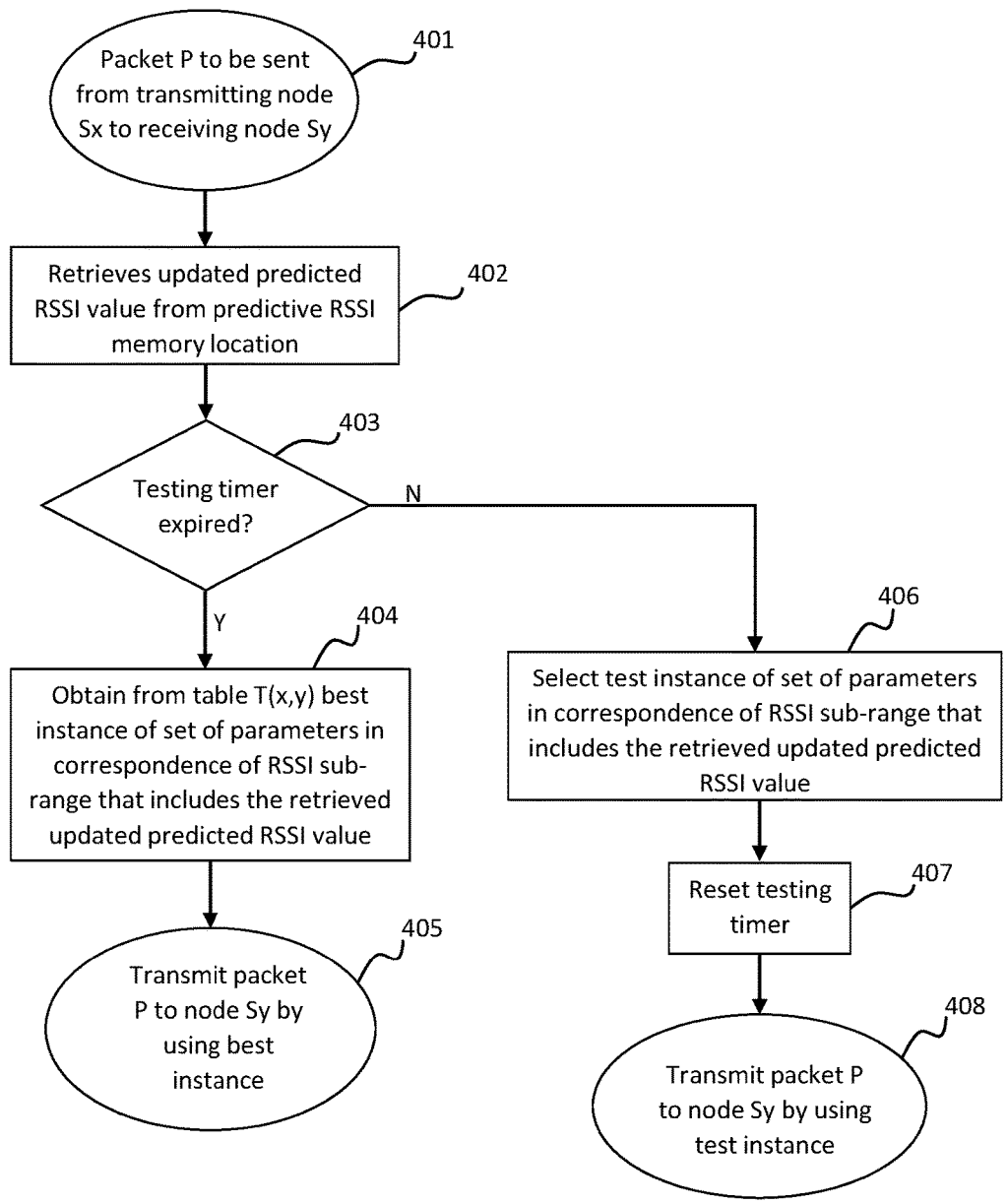
FIG. 4 is a block diagram showing steps to be performed to transmit a packet according to an embodiment of the present invention.

According to the present disclosure and as schematically shown in FIG. 4, each time a data packet P has to be sent (block 401) by a transmitting wireless node 10 (in the example of FIG. 4, Sx) to another receiving wireless node 10 (in the example of FIG. 4, Sy), the transmitting node Sx is adapted to perform the following steps.

At block 402 the transmitting node Sx obtains the updated predictive RSSI value by retrieving it from the predictive RSSI memory location.

At block 403 the transmitting node Sx checks whether a testing timer, which accounts for a testing time, is expired.

If the testing timer is expired, at block 404 the transmitting node Sx retrieves from the table T(x,y) a best instance within the subset of candidate instances that in the table T(x,y) corresponds to the RSSI subrange including the obtained, updated predicted RSSI value.

As explained in more detail below with reference to FIG. 5, the best instance for the table T(x,y) is periodically determined by the transmitting node Sx.

At block 405 the packet P is transmitted from the transmitting node Sx to the receiving node Sy by using said best instance.

If at block 403 the testing timer is not expired, at block 406 the transmitting node Sx suitably selects, according to a test procedure, a test instance within the subset of candidate instances that in the table T(x,y) corresponds to the RSSI subrange including the obtained, updated predicted RSSI value.

Then, after resetting the testing timer at block 407, at block 408 the packet P is transmitted from the transmitting node Sx to the receiving node Sy by using said test instance.

It is noted that according to the present disclosure, the test procedure at blocks 406-408 is advantageously performed by the transmitting node Sx on data packets, thus avoiding dedicated extra signalling that would introduce unnecessary overhead on the wireless channel.

In a preferred embodiment (not shown), the test procedure at blocks 406-408 is preferentially performed on low-priority data packets (if present in the data flow). This in order to limit the risk of failure for high-priority packets. Anyhow, if no low-priority packets are available in the data flow, the test procedure may be carried out anyway on the available packets, regardless of their priority indicator.

Preferably, during the test procedure the test instance is selected by means of a pseudo-random selection procedure adapted to guarantee that all instances of the set of instances are tested over the time (and in particular that the same test instance is not selected for two or more consecutive times) and in a spread order.

The selection in spread order advantageously enables to optimize the test procedure by significantly reducing the time needed to identify—within the prefixed testing time— the best instance among the set of candidate instances. Indeed, considering, for example, the case wherein in Table (x,y) the subset of candidate instances are sorted as table rows (from 1 to N) by increasing data transmission rate, if the best instance to be identified correspond to a high data transmission rate, the convergence time of the procedure is shortened if the test instances are selected in a spread order with respect to the case wherein the test instances are selected in consecutive order, starting from the first row (corresponding to the lowest transmission rate).

As previously mentioned, every node 10 keeps tables, as the one shown in FIG. 2, for each other node 10 of the wireless network with which a wireless communication can be established. The entries of these tables are updated based on packet transmission feedbacks received from the other nodes in the network.

Figure 5:
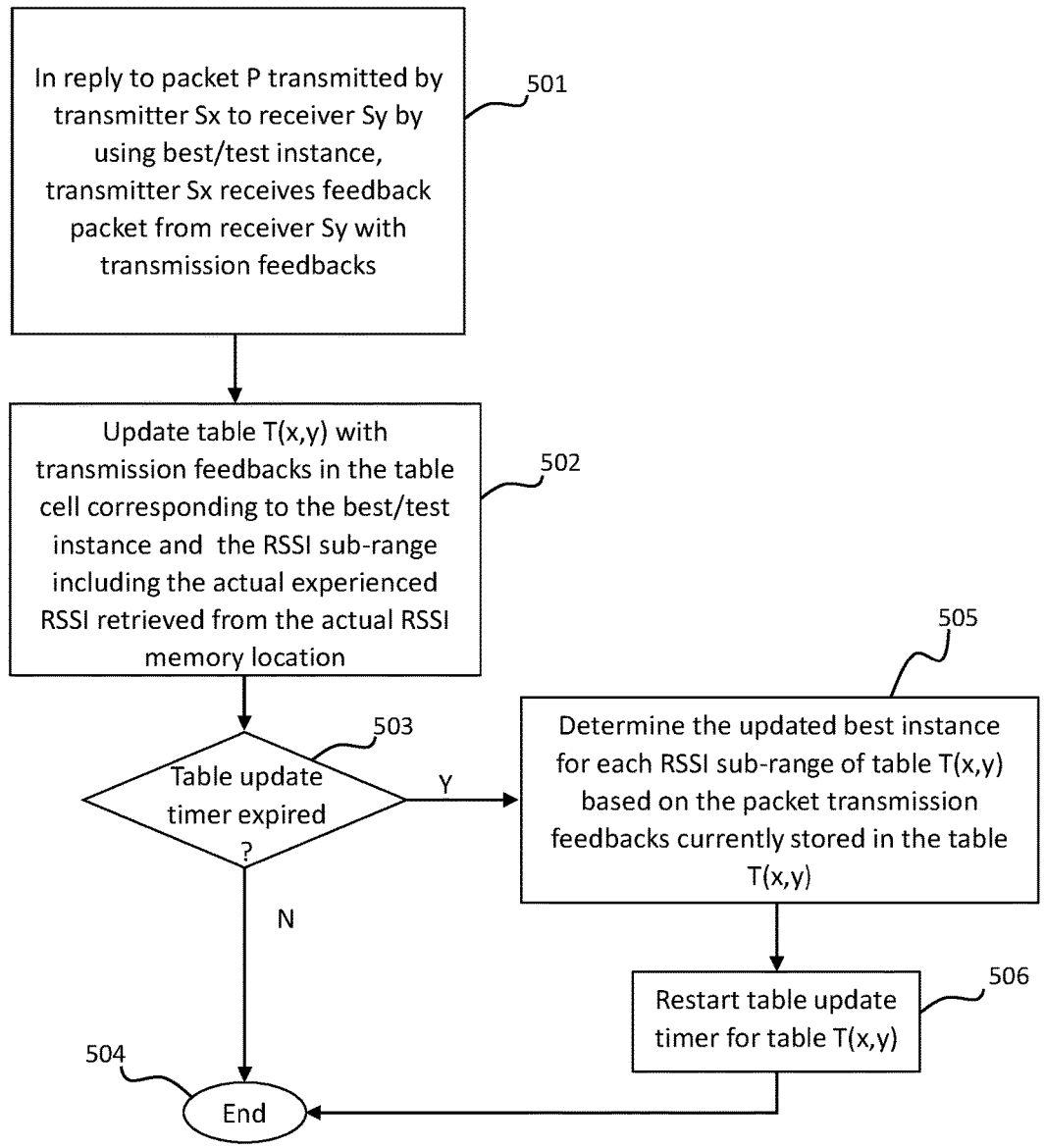
FIG. 5 is a block diagram of a table update procedure according to an embodiment of the present invention.

FIG. 5 schematically shows a table update procedure performed by transmitting node Sx on table T(x,y) kept for transmitting node Sy.

Each time the transmitting node Sx sends a data packet to the receiving node Sy, either using a best instance or a test instance, the transmitting node Sx receives in response from the receiving node Sy a feedback packet comprising packet transmission feedbacks (block 501).

In a preferred embodiment, these packet transmission feedbacks include airtime (in milliseconds) and packet length (in bytes), besides other possible indicators. The airtime is the actual time taken to transmit the packet and defines the channel occupancy time. The airtime takes into account the number of transmission attempts made before success/failure. The higher is the number of attempts the higher is the airtime.

Upon receiving said feedback packet, the table cell corresponding to the (best or test) instance used to transmit the packet P and to the RSSI sub-range including the actual, last experienced RSSI (as retrieved from the actual RSSI memory location)—is updated with the newly received packet transmission feedback (block 502).

In block 503, the transmitting node Sx checks if a table update timer is expired.

If the check has a negative outcome, the table update procedure ends in block 504.

If the check of block 503 has instead a positive outcome, in block 505 an updated best instance is determined for each RSSI sub-range of table T(x,y), based on the packet transmission feedbacks currently stored in the table T(x,y). Then, the table update timer is restarted in block 506 and the procedure ends at block 504.

Accordingly, the best instance in correspondence of each RSSI sub-range of table T(x,y) is periodically re-determined and updated. In this way, at block 404 of FIG. 4 the best instance obtained from table T(x,y) corresponds to the best instance lastly determined at block 505.

According to a preferred embodiment, the determination of the best instance at block 505 is performed so as to optimize a transmission quality indicator, which is determined on the basis of the packet transmission feedbacks stored in the table.

Preferably, the transmission quality indicator is the throughput. The throughput (in Mbits/s) is determined as the ratio between the packet length (in bytes) and the airtime (in milliseconds). Considering that the airtime takes into account the number of transmission attempts made before success/failure, also the value of the throughput so determined is influenced by it. In particular, the higher is the number of attempts the lower is the value of the throughput. In this way the best instance is determined by taking into account the number of transmission attempts made before success/failure of a packet transmission. This is advantageous with respect to a solution (as, for example, that one above mentioned, disclosed by by Glen Judd et al.) wherein the best instance is determined only based on success/failure of past transmissions, without taking into account the number of transmission attempts actually made before achieving a specific result of packet transmission (success or failure).

For each RSQI sub-range, the determined best instance is marked in the table through a suitable flag. In this way, at block 404 of FIG. 4 the best instance can be obtained from table T(x,y) by retrieving from the table T(x,y) the best instance marked with the flag in correspondence of the relevant RSQI sub-range.

According to a preferred embodiment, the best instance actually defines a number (e.g. 3) of best instances suitably prioritized.

This embodiment is advantageous when the wireless nodes comprise a wireless chipset equipped with retry-chain functionality, that is adapted—any time a packet has to be sent—to try in sequence a number of instances of transmission parameters, in case of failure of the packet transmission.

Preferably, said number of best instances is prioritized in part (preferably the ones with higher ranks) based on optimization of the transmission quality indicator and in part (preferably the ones with lower ranks) based on the probability of achieving a successful transmission.

In the example of three prioritized best instances, the first best instance and the second best instance may be the ones that in the Table (x,y) correspond to the first best and second best throughput (in correspondence of the relevant RSQI sub-range). The third one may be the one that in the Table (x,y) corresponds to the highest probability of achieving a successful transmission.

In a further development of the present disclosure, each wireless node 10 can be configured to save (e.g. in a non-volatile memory thereof) the latest-updated best instances determined for each table T(x,y) kept by the node, each time the wireless node 10 node is switched off. In this way, said latest-updated best instances can be retrieved when the wireless node is switched on again. This may be advantageously useful in mobile applications wherein the nodes are periodically switched on and off (like, for example, in the case of wireless nodes located in a vehicle (e.g. a train) wherein the nodes are periodically switched on and off anytime the vehicle exits/enter from/into a train depot, e.g. every morning/night), and wherein the wireless nodes (e.g. on trains) of the mobile domain (e.g. a subway system) move with respect to the wireless nodes of the stationary domain (e.g. railway line) according to a same path, many times every day.

Figure 6:
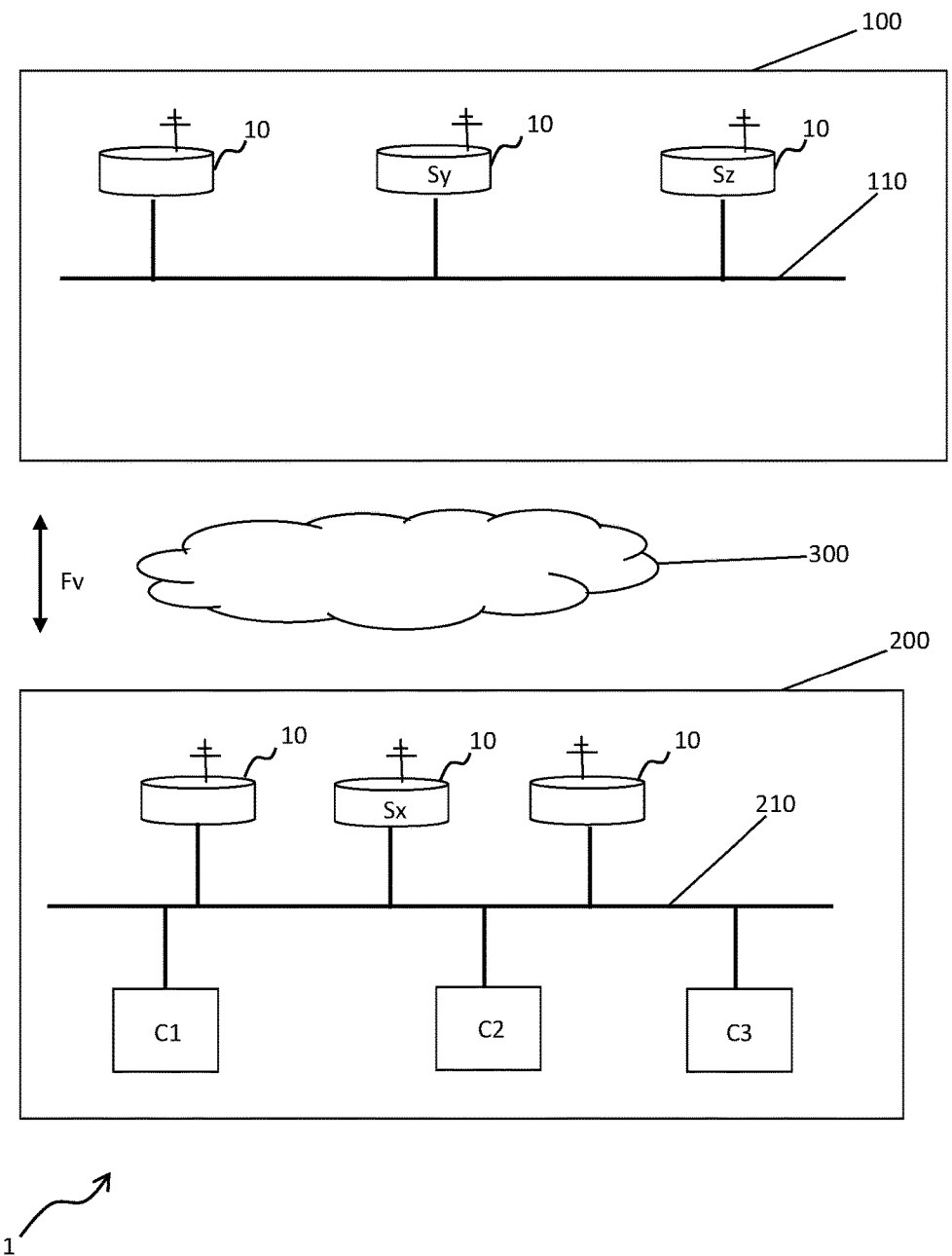
FIG. 6 is a schematic diagram showing a wireless communication system according to an exemplary embodiment of the present invention.

FIG. 6 shows an exemplary embodiment of the wireless communication system 1, wherein the wireless nodes 10 are in part located in a primary domain 100 and in part located in a mobile domain 200. In a mobility scenario, the mobile domain 200 is movable with respect to the primary domain 100.

The mobile domain 200 can be a vehicle as, for example, a (ferry)boat, a train, a bus, a car or similar vehicle.

The primary domain 100 can be installed on a railway line, coastwise, on a road line and similar.

The wireless nodes 10 of the primary domain 100 can be connected to each other either via wired or wireless links (or any combination of them) by means of suitable wireless/wired interfaces.

Packets communications among the wireless nodes 10 of the primary domain and mobile domain 200 are performed through the wireless communication network 300.

The primary domain 100 comprises a wired and/or wireless network backbone 110 providing connectivity inside the primary domain 100.

The topology of the network backbone 110 can be arbitrary and it may contain heterogeneous segments implemented using any suitable communication technology. Examples of such technologies are: Ethernet, optical fiber, layer-2 VPNs (Virtual Private Networks) over broadband xDSL (Digital Subscriber Line), wireless technologies such as IEEE 802.11, WiMax, cellular, and similar.

The mobile domain 200 may comprise a LAN (local area network) 210 providing connectivity inside the mobile domain 200. Preferably, the LAN 210 is implemented by using Ethernet technology. However, other technologies may be used as, for example, optical fiber, layer-2 VPNs over broadband xDSL, wireless technologies such as IEEE 802.11, WiMax, cellular, and similar.

The LAN 210 can be wired (as exemplarily shown in FIG. 6) and/or wireless.

The mobile domain 200 comprises also a plurality of client devices C1, C2, C3 that can be connected to the LAN 210 either directly or through a wireless access point (not shown). The wireless access point(s) can be, for example, a wireless modem/router, a PC, a mobile phone, a laptop or a similar device providing wireless access point functionality.

The client devices C1, C2, C3 can be, for example, video cameras, laptop, PC, mobile phones, PDAs, and similar.

In an embodiment, the wireless nodes 10 are wireless routers.

In an exemplary implementation of the invention, the primary domain 100 can be installed coastwise and the mobile domain 200 on a train.

As it will be clear from the above description, the present disclosure, in the various aspects and embodiments, enables to provide an improved solution for transmission parameters selection in a wireless network, which guarantees high performance and throughput even in presence of high channel variability, like in a high-speed vehicular mobility scenario.

The solution according to the present disclosure advantageously uses a proactive approach wherein—thanks to the test procedure—the transmitting node updates the best instances of transmission parameters for the various RSSI sub-ranges based on packet transmission feedbacks received in connection of data packets periodically transmitted by using suitably selected test instances of transmission parameters. This is advantageous with respect to a reactive solution (as, for example, that one above mentioned, disclosed by Glen Judd et al.) because it enables to dynamically adjust the best instances beforehand, so as to prevent transmission failures.

In particular, the packets are transmitted each time with a best instance of transmission parameters that is periodically determined according to a table update procedure.

Thanks to the test procedure, for each RSSI sub-range, all instances corresponding to such RSSI sub-range are tested with time so that, at each periodic determination, the best instance is computed on the basis of increasingly updated transmission feedbacks.

The estimate of the best instance improves over the time, determination after determination.

The fact that the best instance determination is made for intervals (sub-ranges) of RSSI values instead of individual RSSI values is particularly advantageous because it enables to optimize the computational time and complexity for the identification of the best instances. Indeed, for a given RSSI scale of values, it enables to limit the determination of the best instances to a limited number of M sub-ranges, by taking into account only significant variations of the RSSI and avoiding to determine a best instance in correspondence of each individual RSSI value included in the given RSSI scale of values. This is particularly advantageous in case of frequent variations of RSSI, which may typically occur in high mobility scenarios.

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed is:

1. In a wireless communication system, a method of selecting an instance from among a set of instances of a plurality of transmission parameters for transmitting a packet from a transmitting node to a first receiving node of a plurality of wireless nodes, the plurality of transmission parameters including a data transmission rate, the method comprising the following steps performed by the transmitting node:

obtaining an updated predictive Received Signal Quality Indicator value reflecting signal quality expected to be experienced by the first receiving node on the packet received from the transmitting node, obtaining a best instance from among the set of instances of the plurality of transmission parameters, in correspondence of a Received Signal Quality Indicator sub-range, among contiguous non-overlapping sub-ranges of a predefined range of Received Signal Quality Indicator values, that includes the obtained updated predictive Received Signal Quality Indicator value, and transmitting the packet from the transmitting node to the first receiving node by using the obtained best instance, wherein, the transmitting node maintains a first table associated with the first receiving node wherein, for each Received Signal Quality Indicator sub-range and for each instance, the first table comprises packet transmission feedbacks received by the transmitting node from the first receiving node for a last packet transmitted from the transmitting node to the first receiving node by using the instance, and for which the first receiving node experienced an actual Received Signal Quality Indicator value, which is included in the Received Signal Quality Indicator sub-range, the best instance is determined by the transmitting node for each Received Signal Quality Indicator sub-range, based on the packet transmission feedbacks stored in the first table in correspondence of the Received Signal Quality Indicator sub-range, the first table is updated using a first table update procedure when a feedback packet, comprising the transmission feedbacks, is received by the transmitting node from the first receiving node after a packet is sent from the transmitting node to the first receiving node, and the transmitting node periodically performs a test procedure wherein, instead of using the best instance, the packet is transmitted by the transmitting node to the first receiving node by using a test instance selected among the set of instances for the Received Signal Quality Indicator sub-range that includes the obtained updated predictive Received Signal Quality Indicator value.

2. A method according to claim 1, wherein the Received Signal Quality Indicator is a Received Signal Strength Indicator.

3. A method according to claim 1, wherein the best instance is determined so as to optimize a transmission quality indicator.

4. A method according to claim 3, wherein the transmission quality indicator is determined on the basis of the packet transmission feedbacks stored in the first table, the packet transmission feedbacks preferably comprising airtime and packet length.

5. A method according to claim 1, wherein the best instance is periodically determined for each Received Signal Quality Indicator sub-range within the first table update procedure.

6. A method according to claim 1, wherein the step of obtaining the best instance is performed by retrieving from the first table the best instance that is marked with a suitable flag in correspondence of the Received Signal Quality Indicator sub-range.

7. A method according to claim 1, wherein for each Received Signal Quality Indicator sub-range, the best instance is determined among a suitably selected subset of candidate instances of the set of instances, corresponding to the Received Signal Quality Indicator sub-range.

8. A method according to claim 7, wherein for each Received Signal Quality Indicator sub-range, the subset of candidate instances is dynamically modified with respect to a predefined subset of candidate instances by adding an additional instance that corresponds to one of a higher data transmission rate and a lower data transmission rate with respect to one of a maximum data transmission rate and a minimum data transmission rate of the predefined subset when the best instance determined for the Received Signal Quality Indicator sub-range corresponds to one of the maximum data transmission rate and the minimum data transmission rate and remains unchanged for a first predetermined time interval.

9. A method according to claim 8, wherein the dynamically modified subset of candidate instances is restored to the corresponding predefined subset of candidate instances if, for a second predetermined time interval, no step of obtaining the best instance is performed for the Received Signal Quality Indicator sub-range corresponding to the dynamically modified subset of candidate instances.

10. A method according to claim 1, wherein, in the test procedure, the test instance is selected using a selection procedure adapted to guarantee that, for the Received Signal Quality Indicator sub-range that includes the obtained predictive Received Signal Quality Indicator value, all instances of the set of instances are tested over time and in a spread order.

11. A method according to claim 1, wherein the test procedure is performed on data packets.

12. A method according claim 1, wherein the test procedure is performed when the packet to be transmitted is a low priority packet.

13. A method according to claim 1, wherein, for a packet transmitted from the transmitting node to the first receiving node on the basis of an updated predictive Received Signal Quality Indicator value, when in the feedback packet received by the transmitting node from the first receiving node, the transmitting node detects a decrease of the actual Received Signal Quality Indicator value with respect to the updated predictive Received Signal Quality Indicator value of at least 10 dB, the actual best instance corresponding to the Received Signal Quality Indicator sub-range that comprises the actual Received Signal Quality Indicator value is replaced with an instance of the set of instances that corresponds to a lower data transmission rate with respect to the actual best instance.

14. A method according to claim 1, wherein an active probing procedure of a second receiving node is performed by the transmitting node, prior to actual data packet transmission to the second receiving node, wherein,
    the transmitting node obtains a predictive Received Signal Quality Indicator value reflecting received signal quality expected to be experienced by the second receiving node;
    for the Received Signal Quality Indicator sub-range that includes the obtained predictive Received Signal Quality Indicator value, the transmitting node selects a suitable test instance among the set of instances;
    the transmitting node sends an active probing packet to the second receiving node, using the selected test instance;
    the transmitting node maintains a second table associated with the second receiving node wherein, for each Received Signal Quality Indicator sub-range of the predefined range of Received Signal Quality Indicator values and each instance of the set of instances, the second table comprises packet transmission feedbacks received by the transmitting node from the second receiving node, for a last active probing packet transmitted from the transmitting node to the second receiving node by using the instance, and for which the second receiving node experienced an actual Received Signal Quality Indicator value, which is included in the Received Signal Quality Indicator sub-range; and
    the second table is updated by means of a second table update procedure anytime a feedback packet, comprising the transmission feedbacks, is received by the transmitting node from the second receiving node after an active probing packet is sent from the transmitting node to the receiving node.

15. A method according to claim 14, wherein for the second table, the transmitting node periodically determines a best instance, among the set of instances, for each Received Signal Quality Indicator sub-range, based on the packet transmission feedbacks stored in the second table in correspondence of the Received Signal Quality Indicator sub-range.

* * * * *